US005517264A

United States Patent [19]

Sutton

[11] Patent Number: 5,517,264

[45] Date of Patent: May 14, 1996

[54] PROJECTOR NIGHT LIGHT

[76] Inventor: Joseph A. Sutton, 50 W. 23rd St., New York, N.Y. 10010

[21] Appl. No.: 281,016

[22] Filed: Jul. 27, 1994

[51] Int. Cl.[6] .................... G03B 21/26

[52] U.S. Cl. .................... 353/119; 353/71

[58] Field of Search .................... 353/119, 71, 82; 362/801; 446/485; 40/367, 443

[56] References Cited

U.S. PATENT DOCUMENTS 3,598,986 8/1971 Love .................... 240/2 AD 4,092,063 5/1978 Koester .................... 353/71

4,129,364 12/1978 Dietz .................... 353/119

5,307,051 4/1994 Sedlmayr .................... 340/573

5,311,226 5/1994 Karasawa .................... 353/30

*Primary Examiner*—William C. Dowling

[57] ABSTRACT

A decorative night light having a display panel for display of an image associated with the display panel simultaneously projects an image on a remote surface such as the ceiling or a wall of the room in which the night light is located. The night light is in the shape of a television and the display panel is located in place of the television screen while the image is projected through the top of the television shaped night light.

10 Claims, 6 Drawing Sheets

PROJECTOR NIGHT LIGHT

FIELD OF THE INVENTION

The present invention relates to the field of night lights. More particularly, the invention relates to upscale night lights that provide an interesting and attractive appearance, both during periods of use and during times when the product of the invention is not in use. The provision of a decorative light fixture provides an attractive appearance when the product is not actuated, while the projector feature of the invention provides an interesting and attractive illuminated shape combined with an illuminated display which combine to provide a very functional and attractive end result.

BACKGROUND AND SUMMARY OF THE INVENTION

Previously known night lights include a wall mounted type having an electrical plug adapted to be plugged into a wall outlet and a small light socket adapted to receive a night light bulb, typically of less than ten watts. The mounting to the wall is accomplished entirely through reliance on the snug interference fit of the electrical prongs of the plug with the wall outlet. These night lights often include a small shield extending about halfway around the bulb to protect the bulb and to aid in directing the light emanating from the bulb. Some embodiments of these arrangements permit the shield to be rotated about the bulb to further aid in directing the light shining from the night light. In these embodiments, the shield can be used to prevent the light from shining directly into the eyes of a person in the illuminated room, provided that the person is located in a position along the path of the rotating shield. Unfortunately, it is sometimes necessary to direct the light into a corner or directly towards the floor to avoid the eyes of the person in the room, particularly when the person is seated such that the chair directly faces the night light. In such situations, where the light is directed into a corner, the illumination of the room is often inadequate and the night light is not really fulfilling its intended purpose. Typically these night lights include a mechanical toggle switch for turning the light bulb ON and OFF. FIG. 1 illustrates a typical night light of this sort.

Another type of previously known night light is generally similar to that described above, but relies on a photosensor for activation of the night light bulb. Typically, this type of night light does not include the movable shield for directing the light shining from the bulb, but rather relies on a light diffusing cover over the bulb.

Another night light arrangement is of a type that is sometimes associated with a children's lamp. In one embodiment of such a night light, illustrated in FIG. 2, the base of the lamp is hollow and includes a light socket suitable for a night light bulb. The base of the lamp is translucent and includes an illustration of, for instance, a popular children's nursery rhyme character. When the room is darkened and the night light is turned on, the characters depicted on the base of the lamp can be seen by the child in the room. Night lights of this type can be located substantially anywhere a lamp could be located, but are not generally suitable for any location which can be reached by a child due to the risk that the full size bulb utilized in the lamp could become broken and could seriously cut a small child. Night lights of this type offer a muted light due to the translucent base of the lamp and are very effective at providing dim room lighting. However, because of the translucent base, the total lighting provided is not as great as that provided by the direct illumination offered by the wall mounted type of night light described above. It is often desired to provide substantially direct illumination of the ceiling or wall of a room to provide adequate lighting for a small child to safely walk around the room during periods of darkness, utilizing only the light from the night light. Similarly, when a child is sleeping in the room it is desirable that the night light provide sufficient illumination for a parent to enter the room without the need to turn ON any other light than the night light being employed in the room.

The present invention offers substantially all of the utility of each of the previously described types of night lights, including the illumination of a wall or ceiling with substantially direct lighting, and muted lighting of the room through the use of a translucent display panel, all without compromising any of the advantages of compact size, light weight, convenient wall mounting and attractive appearance. In addition, in accordance with an alternative embodiment of the invention, it is possible to achieve substantially all of these benefits (except for the wall mounting feature) through the use of a table top night light.

OBJECTS OF THE INVENTION

It is an object of the present invention to provide a night light having a pleasing appearance both during use and during periods when the bulb is not illuminated.

It is another object of the invention to provide a night light that provides increased illumination, for a given size bulb, of a child's room relative to night lights having shields covering the bulbs.

It is yet another object of the invention to provide a night light that can be secured to a wall through the use of the prongs of the electrical plug while still providing the ability to direct the unshaded light shining from the night light bulb away from the eyes of a child in the room.

It is still another object of the invention to provide a night light having both a decorative illuminated illustration on the structure of the night light and having the illuminating benefits of night lights with unshaded lighting from the night light bulb.

It is still another object of the invention to provide a decorative projected image on the ceiling or wall of the room being illuminated to supplement the decorative illustration on the structure of the night light.

It is yet another object of the invention to provide a decorative shape for the structure of the night light to enhance the overall pleasant appearance of the night light.

It is also an object of the invention to provide the foregoing benefits of the present invention through the use of a compact and efficient structure which is manufactured in an efficient and cost effective product It is still another object of the invention to provide a night light which includes both an illuminated illustration on the exterior of the night light and further includes a projector for projecting an image onto a wall or ceiling, and which is suitable for being located on a tabletop, shelf, floor or the like.

It is yet another object of the invention to provide a manufacturing process for a night light which efficiently results in the production of an attractive and functional night light.

It is another object of the invention to provide a night light having an illuminated image display panel containing an image selected by the user of the night light.

It is yet another object of the invention to provide a night light having a projected image on a ceiling or wall and which has a convenient and easy to change slide holder for display of images recorded on conventional slides.

It is also an object of the present invention to provide a structure for the display and projection of a single image from a single slide, which can be easily changed by the user as desired.

DETAILED DESCRIPTION OF THE INVENTION

Figure 1:
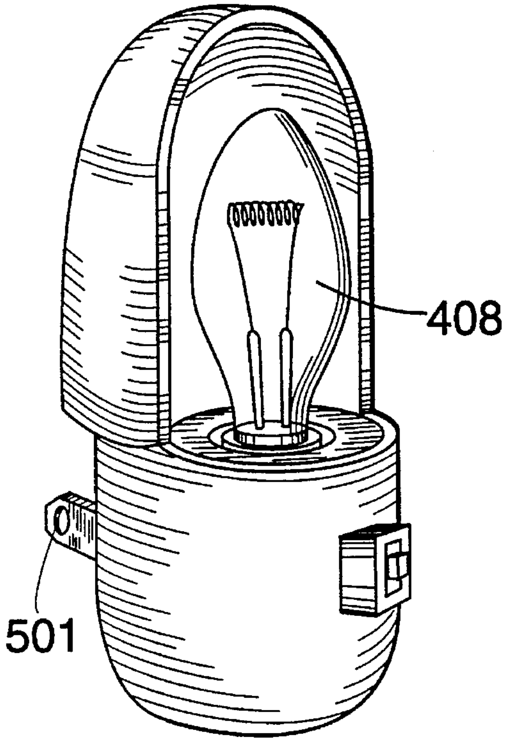
FIG. 1 PRIOR ART
FIG. 1 shows a perspective view of a prior art night light.
Figure 2:
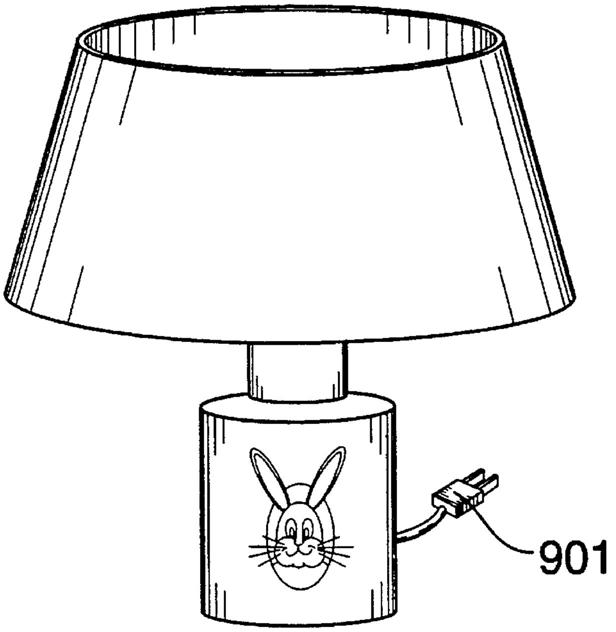
FIG. 2 PRIOR ART
FIG. 2 shows a perspective view or another prior art night light.
Figure 3:
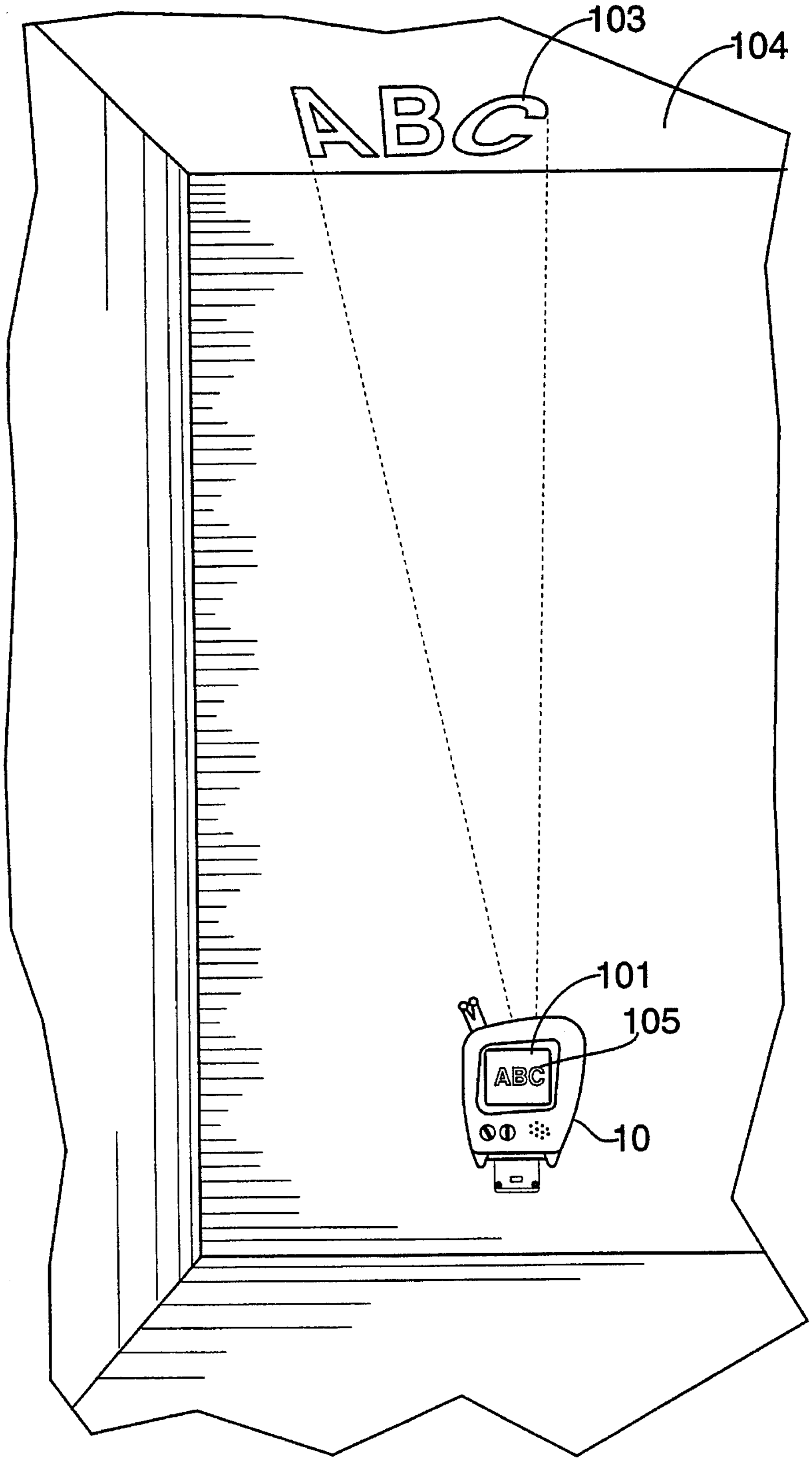
FIG. 3 illustrates a first embodiment of the invention in its operating "turned on" condition.

The present invention relates to a novel concept for night lights and the manner of producing night lights in accordance with this new concept. Referring to FIG. 3, a preferred embodiment of the invention is illustrated where the night light 10 is plugged into a wall outlet (not shown) and is held in place along the wall by the prongs of an electric plug which are plugged into the wall outlet. The electric plug is of the type previously employed for wall mounted night lights, as shown in FIG. 1. This type of support for the night light relies on the snug interference fit of the prongs of the plug into the wall outlet.

Figure 5:
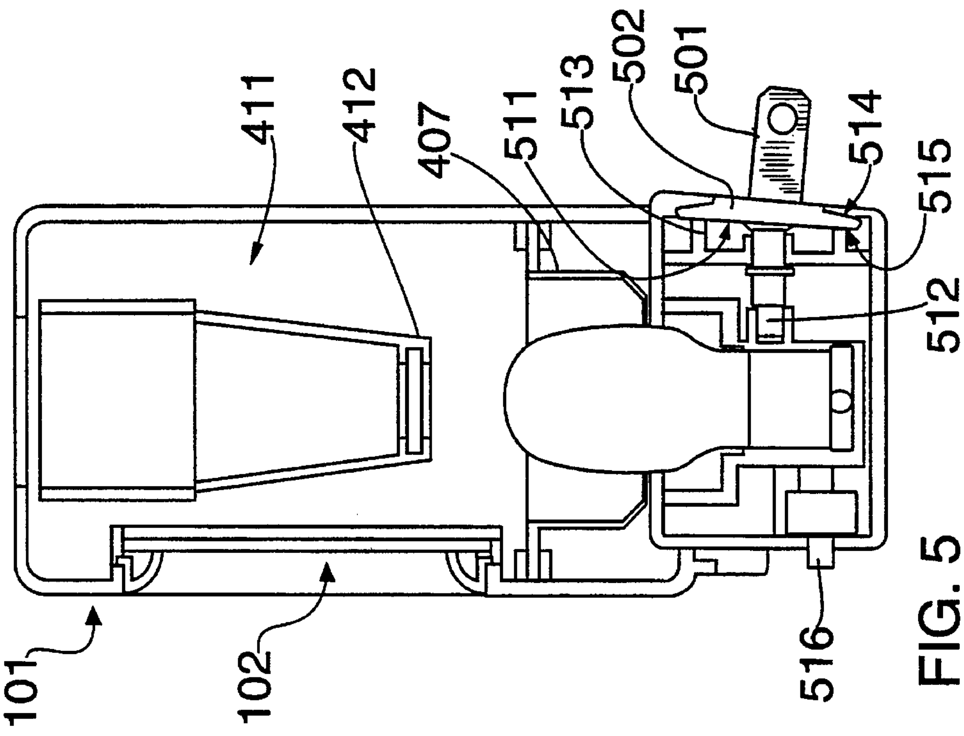
FIG. 5 illustrates a side view of the embodiment shown in FIG. 4.
Figure 6:
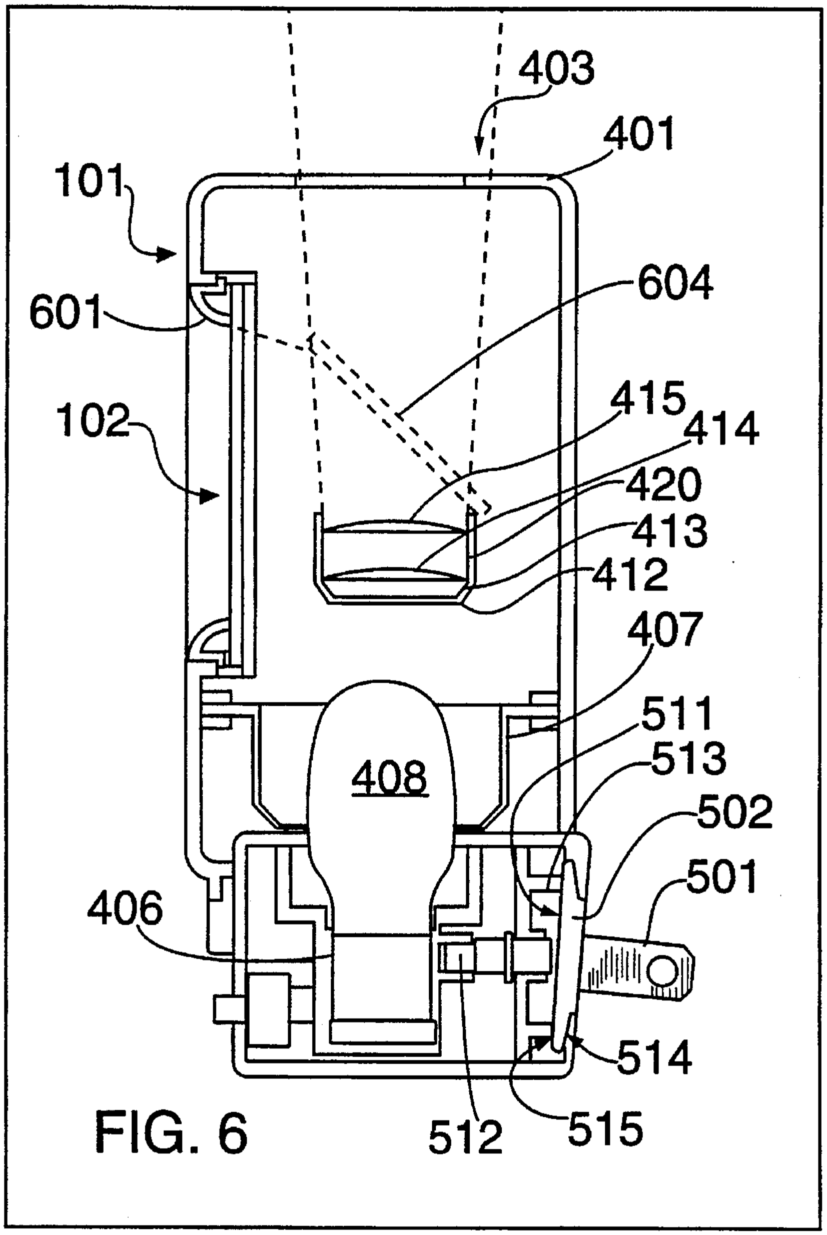
FIG. 6 shows, in greater detail, a preferred decorative illuminated panel and a first embodiment of the manner of providing illumination of the decorative panel.
Figure 8:
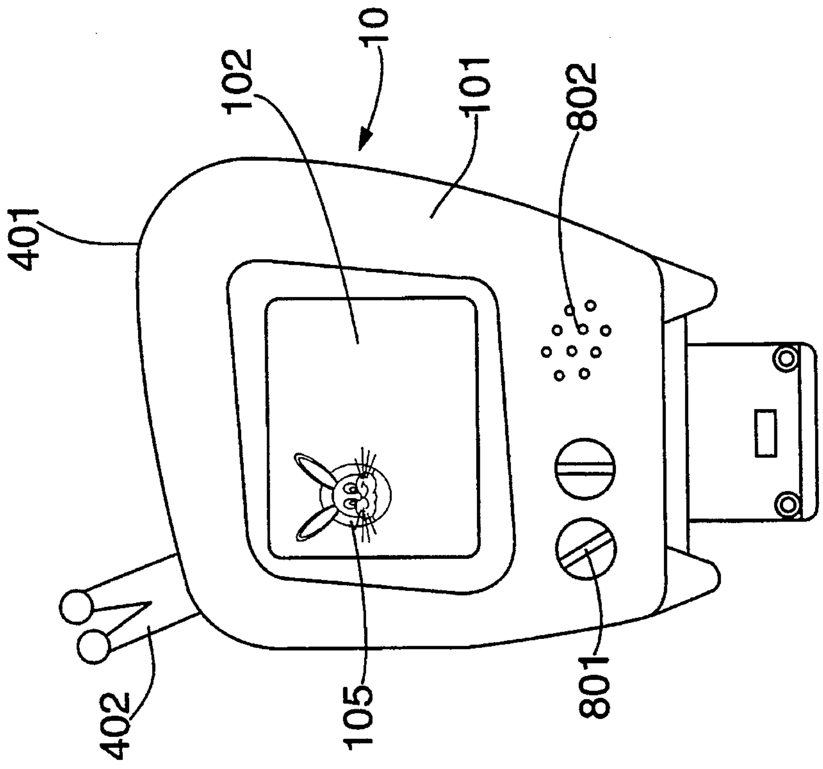
FIG. 8 shows a front view of a preferred embodiment of the invention

Front face 101 of the night light includes a display screen 102 intended to be illuminated from the rear, as shown in greater detail in FIGS. 6 and 8. In operation, the display screen of the night light is illuminated by a light source 408 (shown in FIG. 5) contained within the structure and this same light source is employed in an image projector 411 (shown in FIG. 4) for the projection of an image 103 on the ceiling 104 of the room, as illustrated. The image on the ceiling, in combination with the illuminated image 105 on the display screen provide dual lighting sources for the room in which the night light is located. This dual point illumination provides improved night time illumination relative to single point night lights due to elimination of eerie shadows having sharp contrast. The present invention softens the contrast of any shadows by providing two illumination points 102 and 103, substantially removed from each other.

Figure 4:
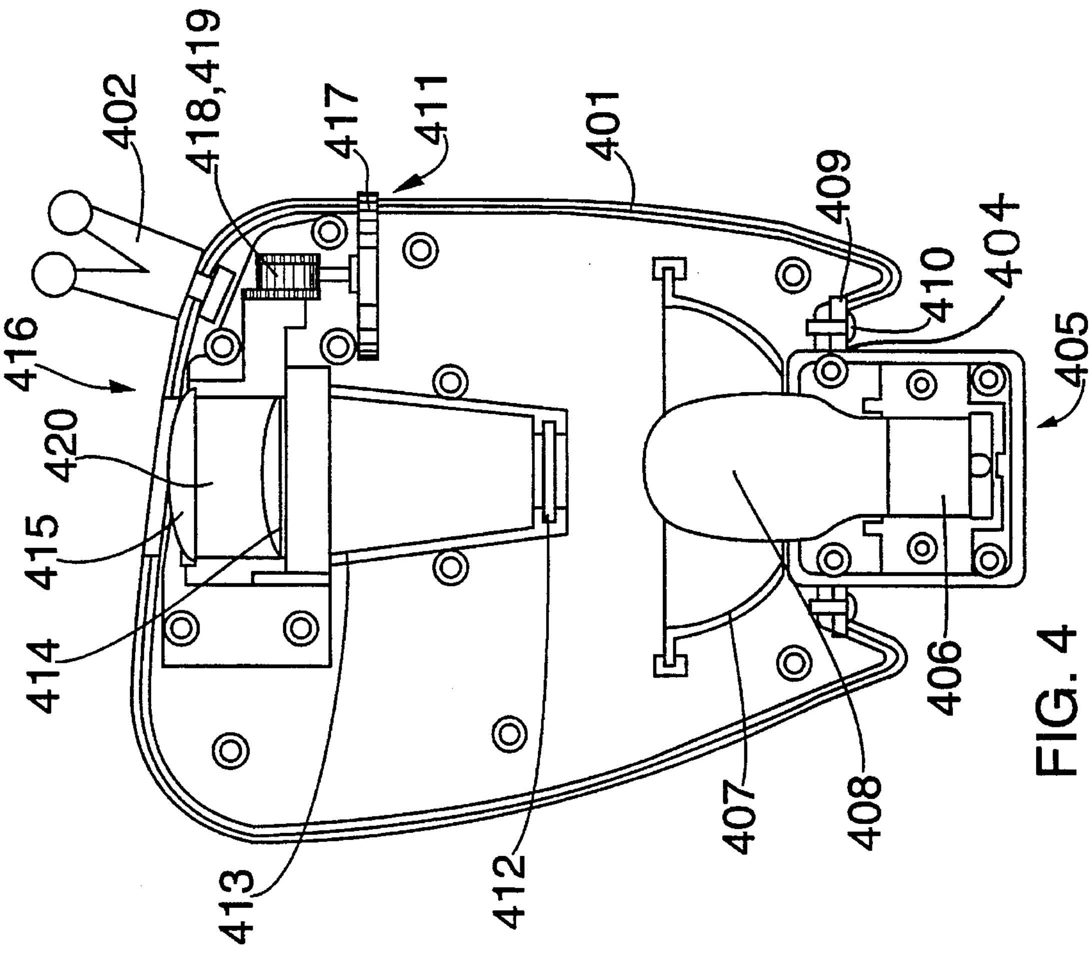
FIG. 4 illustrates a preferred embodiment of the invention, showing the various components employed for this implementation of the invention.

Referring next to FIG. 4, the night light is shown to include a decorative housing body 401 molded into the shape of a television set and including a decorative antenna 402. At the bottom of the television shaped housing is a light source receiving port 404 to which is secured the lamp holder 405. On the top of the television shaped housing is a projection port 403 adjacent to which is located the optical projection system 411.

The lamp holder 405 includes a lamp socket 406, a parabolic reflector 407 and a light source 408, preferably comprising a 7 watt night light bulb, although any other light source having sufficient illuminating capability for the ambient light condition expected would be equally satisfactory. The lamp holder is secured to the light source receiving port by screws 410 which thread into holes located in flange 409 and are readily accessible so that the lamp holder can be easily removed in the event that it is necessary to replace the light source 408. It would also be suitable to employ any other reasonably stable connecting arrangement to secure the lamp holder to the light source receiving port, recognizing that the weight of the night light is to be supported by the lamp holder, as is described in greater detail in connection with the description of FIG. 5.

The optical projection system 411 includes a slide holder 412, an image tunnel 413, input and output lenses 414 and 415 and a focus adjustment mechanism 416. The focus adjustment mechanism includes a focus knob 417 that extends through the side wall of the television cabinet so it can be turned by the user to affect focussing of the night light's projected image on the ceiling. The focus knob is connected to a focussing gear 418 which engages a focus wheel 419. The focus wheel engages the lens carrying structure 420 and operates to slide the lens carrying structure up and down along the axis of the light projection axis A—A. As the lens carrying structure slides up and down it is held substantially perpendicular to the light projection axis because there are provided grooves in the exterior surface of the lens carrying structure and two stationary pins are provided to slide within each groove. As will be readily understood, the exact manner in which the alignment of the lens carrying structure is maintained during focussing of the optics is a matter of convenience and many alternatives are well known in the field of optical systems. As can be seen, the optical projection system is supported by the interior wall of the television shaped housing, and is not connected directly to the projection port 403. This permits movement of the lenses during focussing of the optical system.

Referring to FIG. 5, the television shaped housing is shown from the side for a better illustration of the electrical plug arrangement employed in the preferred implementation of the invention. The prongs 501 are affixed to a rotatable electrical contact plate 502 which permits the night light to be rotated through an arc of 180 degrees to thereby select the location on either the ceiling or wall where the projected image will be displayed. Electrical contacts are provided on the rear surface 511 of rotating plug panel 502 and a center contact 517 is also provided for the other electrical contact. The rotating plug panel 502 is held in place through the forces exerted by compressed spring 512 and the close tolerances of posts 513 and rotation grooves 514 on the front surface of the rotating plug panel 502 and the mating portion 515 of the lamp housing. Additional details of the rotating plug arrangement are provided in connection with the description of FIG. 7.

The optical projection system 411 is located inside the housing and above the light source. The image display panel 102 is located along the front face 101 of the housing, with a slight recess to enhance the visual appeal of the structure, but more importantly, to provide physical protection for the image panel itself. A switch 516 or photosensor (not shown) is provided on the front of the lamp holder for turning the light source ON and OFF. The parabolic reflector is shown to be supported, in substantial part, by the housing.

Referring to FIG. 6, there is shown a backlit image frame 601 holding an image panel 102 having a decorative illustration thereon, preferably on the front, or viewing, side thereof. The image panel 102 is translucent, allowing light to pass through, although such transmitted light is attenuated by the image panel 102 to avoid direct viewing of the bulb 408. This eliminates the need for a separate light shielding structure such as that included in the prior art structure shown in FIG. 1. In a preferred embodiment of the invention, a decorative image is provided on the front of the panel 102 and is visible in ambient light, regardless of whether the bulb 408 is turned ON. Thus, during daylight, the image on the image panel 102 provides an attractive appearance. However, when the bulb is turned ON, the illumination of the image provides an even more attractive appearance for the night light.

To provide for changes in consumer interests, the image panel 102 may be readily removable and can be replaced with a new image panel having an illustration of current interest. This feature will be of particular interest to parents as their children progress from early childhood interests, such as cartoon characters, to interests of slightly older children, such as story book characters. Additionally, the parents' interests may be reflected in the choice of image to be displayed. Thus, instead of displaying animated characters, it will be possible to display, for instance, the ABC's, the child's name or even images of family members or other people or places. The choice of image to be displayed is not limited by the structure of the invention, and thus, any image could be displayed on the image panel 102.

In the foregoing description of the image panel, the image has been recorded on the panel 102 and is displayed as a result of the illumination, from ambient light or from the bulb, of the image panel. An alternative arrangement includes a thin translucent image panel 102 upon which an image can be projected. In this arrangement, the image is not visible until the bulb is turned ON. Thus, when the bulb is OFF, the image screen is blank. In this embodiment of the invention, there is a separate transparency 603 having a recorded image. Light from the bulb is directed through the transparency 603 and onto the rear surface 605 of image panel 102. In the preferred implementation of this aspect of the invention, the image from the transparency 603 is effectively projected onto the rear surface 605 of image panel 102 through reliance on proximity focus. However, it would be feasible to rely on an optical focussing arrangement within the television shaped housing to direct an image onto the focal plane of the panel 102. In this alternative arrangement, it is possible to display the same image on the panel 102 as is projected onto the ceiling by the image projection arrangement. This could be done by placing a glass panel 604 in the path of the projected light emanating from the output lens 415 to achieve partial reflection of the light from the light projection axis A-A towards the panel 102. A separate focussing lens system (not shown) could be employed to focus the image on the panel 102, if necessary. This arrangement would allow the slide contained in slide holder 412 to be used for the simultaneous display of its image on the display panel 102 and on the ceiling. As with the previously described recorded image 603, it is possible to replace the slide in slide holder 412 and thus to obtain a new image for display and projection.

Figure 7:
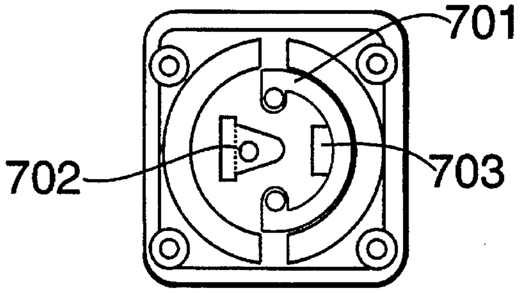
FIG. 7 shows a preferred embodiment of the rotating mechanism associated with the electrical plug, in accordance with a preferred embodiment of the invention.

Referring to FIG. 7, the electrical contact arrangement carried on the lamp holder's stationary structure can be seen to accommodate the rotating plug elements described previously with respect to FIG. 5. Contact brush 701 will align with the corresponding electrical contact on the back surface 511 of rotating plug 502 while central contact member 702 will provide good electrical contact to the center contact517 on the back of rotating plug 502. The rotation limiter block 703 serves to prevent the rotating plug from being rotated beyond the point where the image to be projected by the night light is projected parallel to the floor. This feature serves to assure that the light provided by the night light will be provided at a location where satisfactory illumination of the room can be expected.

FIG. 8 shows a front view of a preferred embodiment of the invention. The housing 401 is in the shape of a television and a decorative antenna 402 is provided to enhance the visual appeal of the night light. Decorative (non-operative) knobs 801 and a speaker grill 802 are provided to further enhance the appearance of the night light. An image display screen 102, in the relative size and shape of a television screen, is provided for viewing of a backlit image 105 contained in the display screen 102. As previously described, the image to be displayed may be provided directly on the image display screen such that the image is visible in daylight, even if the night light is turned OFF. Alternatively, the image display screen may be blank when the light is OFF by providing a translucent screen with an image containing panel 603 being located behind the display screen.

Figure 9:
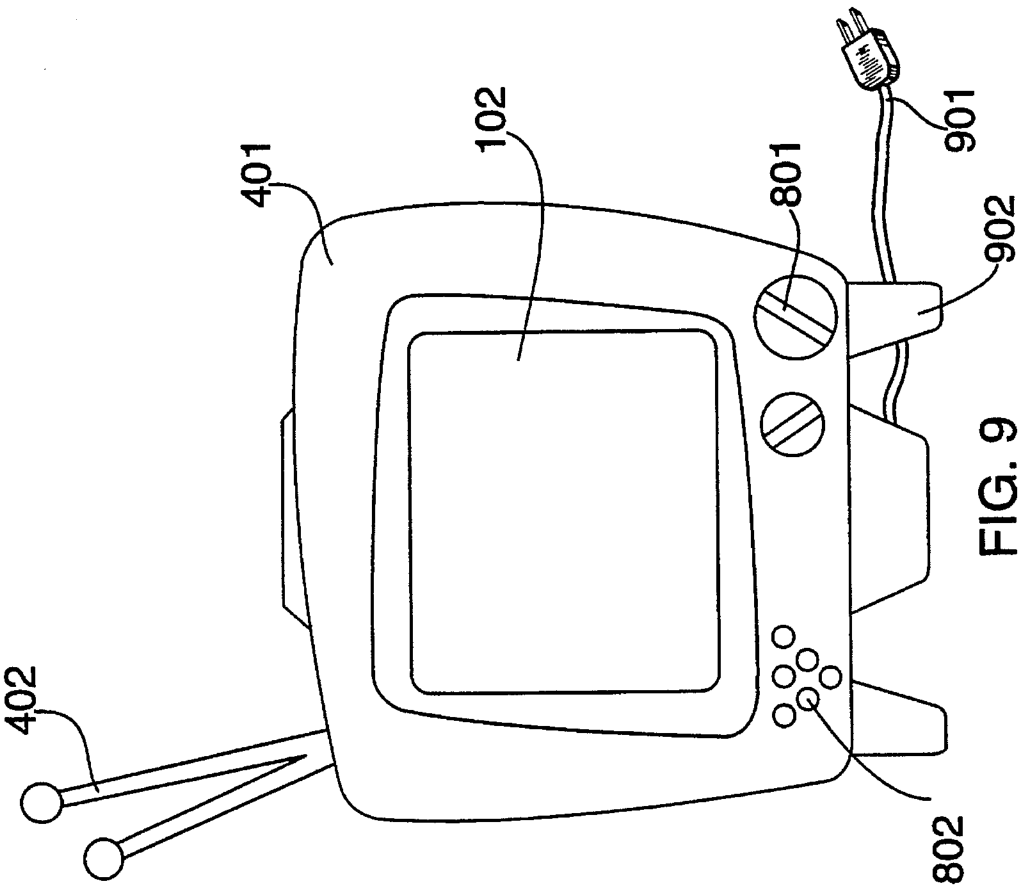
FIG. 9 illustrates another embodiment of the invention.

FIG. 9 illustrates another embodiment of the invention which is tailored to be located on a table, shelf, on the floor or the like. This embodiment of the invention includes an electrical cord 901 to be plugged into an electrical receptacle and includes feet 902 for support of the night light. The front of this embodiment has the appearance of a tabletop television set, including tuning and volume knobs, a speaker grill, an antenna and a television screen.

Figure 10:
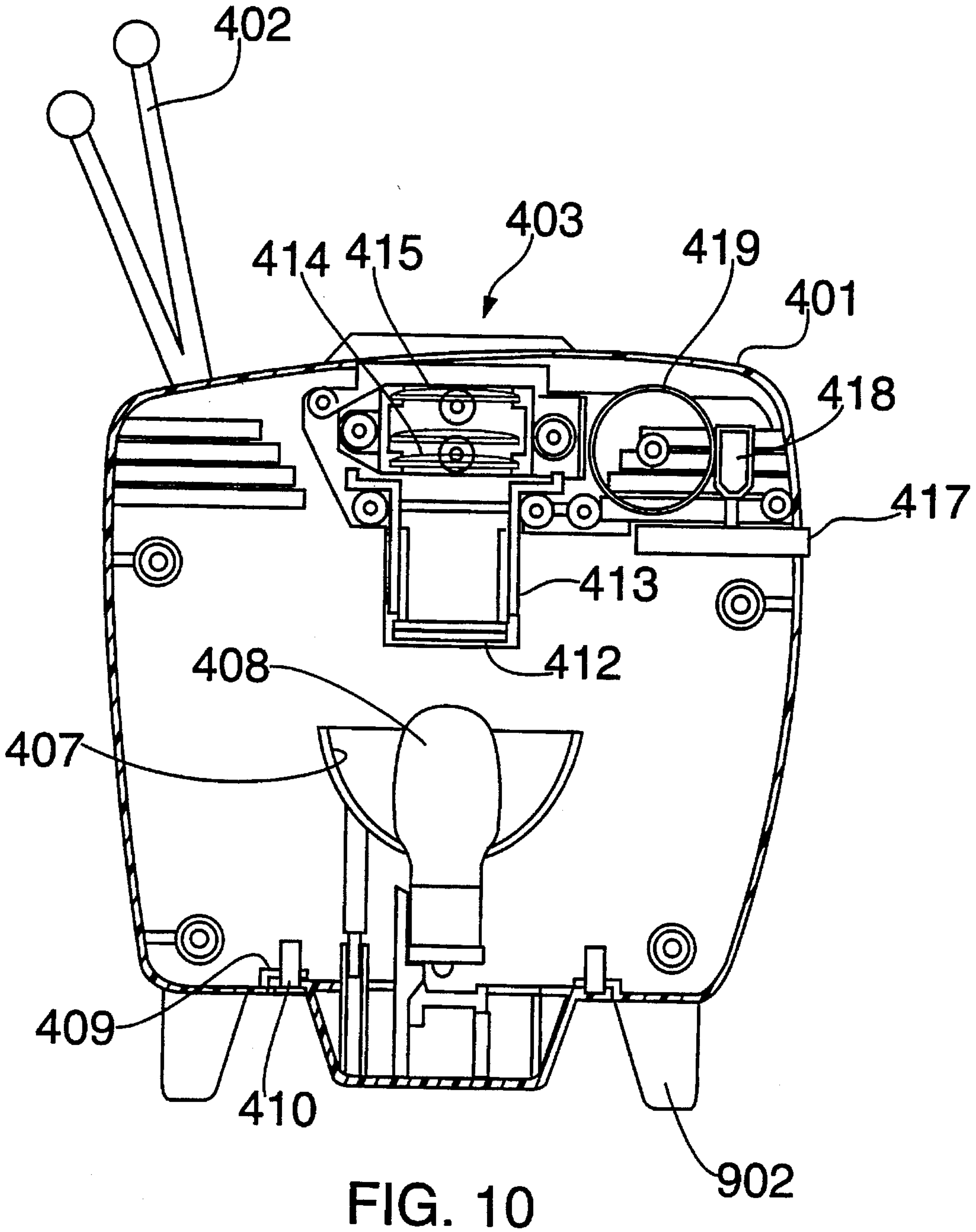
FIG. 10 shows a cross section view of the embodiment of FIG. 9.

FIG. 10 shows the manner in which the optical projection system is configured and the manner in which the bulb is supported within the housing. Reference is made to the description of the common features in connection with the first embodiment described herein in connection with FIGS. 3 through 8. The substantial difference relates to the elimination of the integral rotatable plug arrangement of the earlier described implementation. In the lamp holder of the present embodiment, the electric cord is conventionally fastened to the bulb socket. Legs 101,102 are provided for support and balance of the night light. Otherwise, this embodiment of the invention is similar to the first embodiment described in connection with FIGS. 3 through 8.

While this invention has been described in connection with the specific embodiments shown in the Drawings, it is to be understood that these specific preferred embodiments are exemplary of the embodiments that might be provided in accordance with the invention and are not to be considered as limiting the overall concept of the invention in any manner.

What is claimed is:

1. A night light including an image projector and a display panel, said image projector comprising a light source, a first transparent film having a first recorded image thereon, said first transparent film being illuminated by said light source, and an optical lens system for receipt of light transmitted through said first transparent film from said light source and for focusing said light transmitted through said first transparent film from said light source at a user selected focal plane remote from said night light, said display panel having a viewing surface and a rear surface and having an associated recorded image and means for illuminating said rear surface of said display panel when said light source is turned ON for illuminated display of said associated recorded image on said viewing surface of said display panel, and further comprising a lamp holder suitable for receipt of a conventional night light bulb, a decorative night light housing generally having the shape of a television set, and a rotatable electrical plug having two electrical contact prongs for insertion into a conventional electrical outlet wherein, said light source comprises a night light bulb located in said lamp holder, said lamp holder being removably secured to a bottom portion of said night light housing, said rotatable plug being rotatably secured to said lamp holder, said rotatable plug adapted to support said lamp holder upon insertion of said plug into an electrical outlet, said lamp holder supporting said housing, and said housing supporting said optical lens system.

2. A night light as claimed in claim 1 wherein:

said optical lens system is adjustable along a given optical path to affect focus of the image recorded on said first transparent film at said user selected focal plane, and wherein adjustment of said optical lens system is accomplished by turning of an adjustment knob secured to said housing and having a peripheral edge extending through an opening in said housing to facilitate user access to said knob.

3. A night light including an image projector and a display panel, said image projector comprising a light source, a first transparent film having a first recorded image thereon, said first transparent film being illuminated by said light source, and an optical lens system for receipt of light transmitted through said first transparent film from said light source and for focusing said light transmitted through said first transparent film from said light source at a user selected focal plane remote from said night light, said display panel having a viewing surface and a rear surface and having an associated recorded image and means for illuminating said rear surface of said display panel when said light source is turned ON for illuminated display of said associated recorded image on said viewing surface of said display panel, and wherein said light source is a conventional night light bulb, said first transparent film is a color slide, said night light includes a housing, said optical lens system comprises an input lens and an output lens separated by a first distance and supported in a cylindrical lens support element, said cylindrical lens support element comprises an axial alignment element for maintaining axial alignment during axial sliding of said cylindrical lens support element within said housing relative to said light bulb, said optical lens system further comprises a focusing system for imparting axial movement to said cylindrical lens support element, said focusing system comprising a focusing knob accessible to a user through an opening in said housing, and having a toothed wheel arranged such that turning of said focusing knob causes said toothed wheel to revolve whereupon said revolving of said toothed wheel causes said cylindrical lens support to move axially within said housing, said night light further comprises a fixed holder for said color slide located a first distance from said bulb, said fixed holder comprising an image tunnel having said color slide at an input end and having said optical lens system proximate an output end, said night light further comprises a lamp holder removably secured to said housing, said lamp holder comprising an electrical plug arrangement having first and second prongs suitable for insertion into a conventional electrical outlet and achieving a sufficient interference fit to support said night light, said electrical plug arrangement further comprising a rotatable member allowing said night light to be rotated 180 degrees, said display panel comprising a removable portion of said housing, said associated recorded image being affixed to the viewing surface of said display panel.

4. A night light including an image projector and a display panel, said image projector comprising a light source, a first transparent film having a first recorded image thereon, said first transparent film being illuminated by said light source, and an optical lens system for receipt of light transmitted through said first transparent film from said light source and for focusing said light transmitted through said first transparent film from said light source at a user selected focal plane remote from said night light, said display panel having a viewing surface and a rear surface and having an associated recorded image and means for illuminating said rear surface of said display panel when said light source is turned ON for illuminated display of said associated recorded image on said viewing surface of said display panel, and wherein said light source is a conventional night light bulb, said first transparent film is a color slide, said night light includes a housing, said optical lens system comprises an input lens and an output lens separated by a first distance and supported in a cylindrical lens support element, said cylindrical lens support element comprises an axial alignment element for maintaining axial alignment during axial sliding of said cylindrical lens support element within said housing relative to said light bulb, said optical lens system further comprises a focusing system for imparting axial movement to said cylindrical lens support element, said focusing system comprising a focusing knob accessible to a user through an opening in said housing, and having a toothed wheel arranged such that turning of said focusing knob causes said toothed wheel to revolve whereupon said revolving of said toothed wheel causes said cylindrical lens support to move axially within said housing, said night light further comprises a fixed holder for said color slide located a first distance from said bulb, said fixed holder comprising an image tunnel having said color slide at an input end and having said optical lens system proximate an output end, said night light further comprises a lamp holder removably secured to said housing, said lamp holder comprising an electrical plug arrangement having first and second prongs suitable for insertion into a conventional electrical outlet and achieving a sufficient interference fit to support said night light, said electrical plug arrangement further comprising a rotatable member allowing said night light to be rotated over an arc of 180 degrees and thus to direct the image projected from said image projector over an arc of 180 degrees, said display panel comprising a removable portion of said housing, said associated recorded image being located adjacent to the rear surface of said display panel.

5. A night light including an image projector and a display panel, said image projector comprising a light source, a first transparent film having a first recorded image thereon, said first transparent film being illuminated by said light source, and an optical lens system for receipt of light transmitted through said first transparent film from said light source and for focusing said light transmitted through said first transparent film from said light source at a user selected focal plane remote from said night light, said display panel having a viewing surface and a rear surface and having an associated recorded image and means for illuminating said rear surface of said display panel when said light source is turned ON for illuminated display of said associated recorded image on said viewing surface of said display panel, and wherein said light source is a conventional night light bulb, said first transparent film is a color slide, said night light includes a housing, said optical lens system comprises an input lens and an output lens separated by a first distance and supported in a cylindrical lens support element, said cylindrical lens support element comprises an axial alignment element for maintaining axial alignment during axial sliding of said cylindrical lens support element within said housing relative to said light bulb, said optical lens system further comprises a focusing system for imparting axial movement to said cylindrical lens support element, said focusing system comprising a focusing knob accessible to a user through an opening in said housing, and having a toothed wheel arranged such that turning of said focusing knob causes said toothed wheel to revolve whereupon said revolving of said toothed wheel causes said cylindrical lens support to move axially within said housing, said night light further comprises a fixed holder for said color slide located a first distance from said bulb, said fixed holder comprising an image tunnel having said color slide at an input end and having said optical lens system proximate an output end, said night light further comprises a lamp holder removably secured to said housing, said lamp holder comprising an electrical plug arrangement having first and second prongs suitable for insertion into a conventional electrical outlet and achieving a sufficient interference fit to support said night light, said electrical plug arrangement further comprising a rotatable member allowing said night light to be rotated 180 degrees and thus to direct the image projected from said image projector over an arc of 180 degrees, said display panel comprising a removable portion of said housing, said associated recorded image being said color slide.

6. A night light as claimed in claim 5 further comprising a partial reflecting panel located between said output lens of said optical lens system and the projection port of said housing, said partial reflecting panel serving to direct light projected from said output lens onto said rear surface of said display panel.

7. A decorative night light for wall mounted use comprising a housing in the general shape of a television and having decorative knobs and a decorative antenna, said housing having a projection port on a top surface, a lamp holder port on a bottom surface, a focus knob opening on a side surface and an image display screen port on a front surface, a projection system comprising an electric light source, a recorded image, a lens system and a focus system for adjusting the distance between said lens system and said recorded image, said recorded image being recorded on a transparent film, said transparent film being spaced from said light source along a projection axis, said lens system comprising an input lens and an output lens held in spaced relation in a lens holding cylinder wherein said projection axis passes substantially through the center of said cylinder, and said focus system comprising a focus knob extending through said focus knob opening in said housing, a gear arrangement associated with said focus knob such that rotation of said focus knob results in an adjustment of the axial distance between said recorded image and said lens holding cylinder along said projection axis, a lamp holder removably attached to said housing at said lamp holder port, said lamp holder comprising a socket for said light source and means for providing electrical connection of said socket to a wall outlet for illumination of said light source.

8. A decorative night light as claimed in claim 7 wherein said means for providing electrical connection to a wall outlet comprises an electric cord.

9. A decorative night light as claimed in claim 8 further comprising an image display screen, said image display screen comprising a first translucent panel and a second image panel, said first panel and second panel being adapted to fit into said image display screen port, said second panel situated interior of said first panel such that light from said light source passes through said second panel before striking said first panel whereby a decorative image recorded on said second panel will appear on said first panel upon illumination of said light source.

10. A decorative night light having an electric night light bulb located within a closed housing and including an image display panel on a front face of said housing for display of an illuminated image upon illumination of said bulb and further including an image projection system for projection of an image recorded on a film located within said housing onto a ceiling, wherein said image projection system includes means for focusing said projected image, and wherein said closed housing is a decorative housing substantially in the shape of a television, wherein said image projection system includes a set of image projecting lenses, wherein said image display panel is located within a recessed portion of the front face of said housing resembling a television screen, and wherein said means for focusing said projected image comprises a focus knob accessible on the exterior surface of said housing for adjusting the distance between said film and said image projecting lenses.

* * * * *